May 25, 1965 R. J. REID 3,185,189
DEVICE FOR USE IN THE PREPARATION OF LAYER DRINKS
Filed April 23, 1962
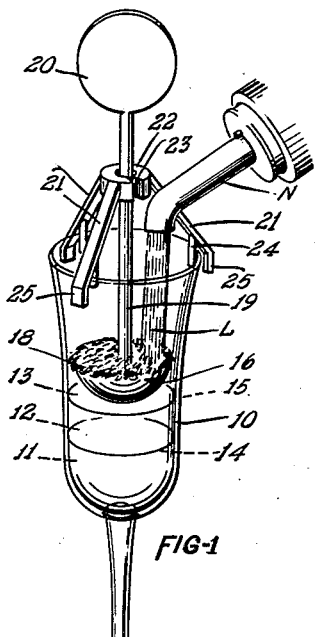
FIG-1
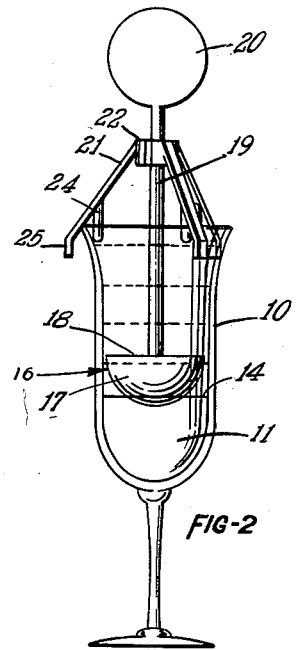
FIG-2
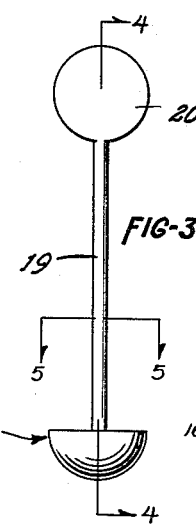
FIG-3
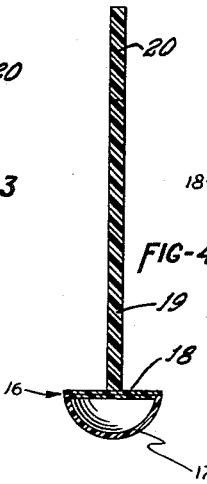
FIG-4
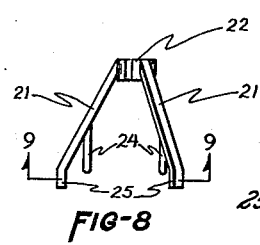
FIG-5
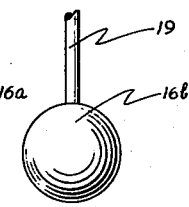
FIG-6
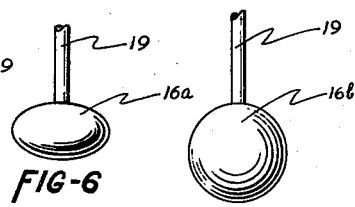
FIG-7
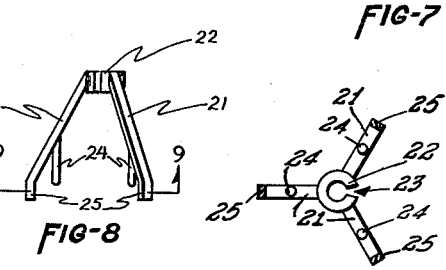
FIG-8
FIG-9
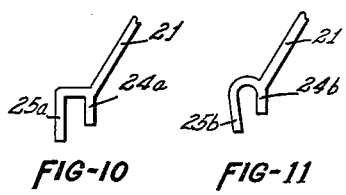
FIG-10 FIG-11
INVENTOR.
Robert J. Reid
BY United States Patent Office 3,185,189
Patented May 25, 1965

3,185,189
DEVICE FOR USE IN THE PREPARATION OF LAYER DRINKS
Robert Joseph Reid, 910 Jean Drive, Apt. B, Campbell, Calif.
Filed Apr. 23, 1962, Ser. No. 189,557
6 Claims. (Cl. 141—100)

This invention relates to a device for use in the preparation of drinks such as "Pousse Cafe" which consist of superposed layers of different colored liqueurs or syrups having different specific gravities.

It is an object of this invention to provide a relatively simple device whereby multiple-layered drinks known as "Pousse Cafe" may be prepared by persons whether skilled or unskilled in the preparation of these drinks without painstaking operations heretofore required.

Another object of this invention is to provide a relatively simple device in the nature of a float which may be inserted into the cordial or similar glass to facilitate the pouring of multiple-layer drinks.

Still another object of this invention is to provide an improved device in the nature of an insert that is adapted to be placed into a cordial or similar glass to facilitates the pouring of liqueur therein and to insure the separation of the liqueurs into distinct layers.

Still another object of this invention is to provide an improved device for the efficient preparation of multiple-layered drinks, said device being in the nature of a float shaped to guide the liqueur poured on the top thereof to flow in a thin sheet to the inner wall of the cordial glass so that the liqueurs poured into the glass one after another form distinct layers therein.

Other and further objects of this invention will be apparent to those skilled in the art to which it relates from the following specification, claims and drawing.

In accordance with this invention, there is provided a simple and inexpensive device through the use of which persons unskilled in the bartender's art are enabled to produce multiple-layered drinks also known as "Pousse Cafe" which have professional appearance and which may be produced without the usual painstaking and time-consuming operations. This invention comprises principally a float which may be made of plastic material resistant to alcoholic beverages so that it does not contaminate such beverages. This float is made of a diameter somewhat less than the inner diameter of the cordial glass so that it may be inserted therein, and it is provided with a stem and guide means so that it is held erect in the glass.

In the preparation of the multiple-layered drink, the bottom layer is poured into the glass without this device in position. Thereafter this device is placed into the glass on the bottom layer and the succeeding layers are poured on the top of the device in succession. This device functions to guide the liqueur to the peripheral edges of the device adjacent to the inner wall of the glass and the liqueur is spread out into a thin sheet as it runs down the inner walls of the glass to form a layer underneath the float. Thus, drinks of this type may be prepared efficiently without the practiced and time-consuming slow pouring of the liqueurs heretofore required and any novice may prepare these drinks by the use of this invention.

Further details and features of this invention will be set forth in the following specification, claims and drawing in which, briefly:

FIG. 1 is a perspective view showing this invention positioned in a cordial glass and liqueur being poured into the glass to form one of the layers of a multiple-layered drink;

FIG. 2 is a view in side elevation showing this device positioned in the cordial glass;

FIG. 3 is a view in side elevation of the float and stabilizing member thereof;

FIG. 4 is a sectional view taken along the line 4—4 of FIG. 3;

FIG. 5 is a sectional view taken along the line 5—5 of FIG. 3;

FIG. 6 is a view of a modified form of float;

FIG. 7 is a view of a further modified form of float;

FIG. 8 is a view in side elevation of the glass engaging guide employed in accordance with this invention;

FIG. 9 is a sectional view taken along the line 9—9 of FIG. 8;

FIG. 10 is a view of a modified form of finger structure for the guide; and

FIG. 11 is another modified form of finger structure for the guide.

Referring to the drawing in detail, there is illustrated an embodiment of this invention in which the glass 10, which is of a shape generally used for cordial drinks, is provided with a float 16 to facilitate the preparation of a layered formation in the "Pousse Cafe" type drink. In the use of this invention the bottom layer 11 is poured into the glass 10 without the float 16 positioned therein. After the bottom layer 11 is poured into the glass, the float 16 is placed therein so that the arcuate bottom 17 contacts the upper surface 14 of the liquid 11. The float 16 is made so that a substantial part thereof remains above the upper surface of the liquid 11 and the substantially flat top 18 thereof is spaced well above the liquid.

The body of the float 16 is made of a diameter somewhat smaller than the inner diameter of the glass 10 so that the liquid L poured on top of the float 16 from the nozzle N is spread out over the upper surface of the float and flows in a thin sheet over the edges of the float to the inner surface of the glass 10 and down to the upper surface of the liquid in the glass. Thus, after the first layer 11 is placed into the glass and the float 16 is placed thereon, the liquid for the second layer 12, which has a different specific gravity from that of the liquid in layer 11, is poured on the top of the float and is spread out to the sides of the glass and flows downward to form the layer 12 which is distinct from the layer 11. The boundary between these layers is visible as a well defined plane 14. As the liquid for the layer 12 is poured into the glass and proceeds down around the float 16, the float gradually rises and assumes its position on the upper surface 15 of the layer 12.

In order that the float 16 be maintained properly orientated in the glass, a stem 19 which is fixedly attached to the top 18 is provided to the float. This stem extends upward out of the top of the glass and a flag or grip portion 20 which may carry a message or advertising is provided thereto. A guide which is provided with three members 21 that straddle the upper part of the glass is also provided with a central member 22 which slidably engages the stem 19. A slot 23 is provided in the member 22 so that the stem 19 may be inserted into the central hole formed in the member 22. The member 22 may be made of yieldable plastic material so that the slot 23 may be expanded to receive the stem 19 which is of greater diameter than the normal width of the slot. The arms 21 are provided with fingers 24 which project therefrom to engage the upper part of the glass 10 as shown in FIG. 2 and thereby prevent the guide frame slipping on the glass. Additional members 25 are provided to the ends of the arms 21 and these overhang the glass and function as guides in the placing of the guide frame on the top of the glass. These members 24 and 25 may take different shapes, as shown in FIGS. 10 and 11. The member 24a shown in FIG. 10 is formed by slightly bending the arm 21 downward and the member 25a is formed by providing a right angle shaped piece formed integral with or attached to member 21 just above the member 24a. A similar arrangement is provided as shown in FIG. 11 in which the member 25b is provided with an arcuate upper portion and is attached to the member 21 just above the member 24b. Similar arrangements are provided to all of the arms or members 21 so that the upper edge of the glass may be positioned between the members 24a and 25a or between the members 24b and 25b in each case.

Also, the float 16 may take different shapes, such as shown in FIGS. 6 and 7. The shape shown in FIG. 6 is substantially ellipsoidal whereas, the shape shown in FIG. 7 is substantially spherical. Both of these shapes function substantially the same as a float of hemispherical shape in that they also spread the liquid poured on the top thereof to cause it to flow downward in a thin sheet as the liquid envelopes the upper surface of the float. Thus, the sheet-like flow of liquid is guided to the inner surface of the glass.

The float 16, stem and guide may be made of different plastic materials that are insoluble in the liquids with which it is to be used. Material such as glass may also be used in making the float and stem, however, plastic material which is yieldable so that the stem 19 may be inserted into the member 22 is preferred for the guide.

While I have shown a preferred embodiment of the invention, it will be understood that the invention is capable of variation and modification from the form shown so that its scope should be limited only by the scope of the claims appended hereto.

What I claim is:

1. In a device for use in the preparation of varied layer drinks conventionally known as "Pousse Cafe" by pouring liqueurs of different colors, one after another, into a glass such as a cordial glass, the combination comprising a float adapted to fit loosely into the cordial glass which has solid imperforate side walls, said float being adapted to float on the liquid in said glass, said float having means engaging said glass for holding said float in a predetermined orientation with respect to said glass so that liquid poured on said float is directed in sheet-like manner to inner surfaces of said solid imperforate side walls of the glass and flows down said inner surfaces to form a distinct liquid layer in the glass showing a distinct boundary between it and the liquid previously poured into the glass.

2. In a device for use in the preparation of varied layer drinks conventionally known as "Pousse Cafe" by pouring liqueurs of different colors, one after another, into a glass such as a cordial glass, the combination comprising a float adapted to fit loosely into the cordial glass which has solid imperforate side walls, means for holding said float in a predetermined orientation with respect to said glass so that it floats on the liquid poured into said glass and liquid poured thereon is directed in sheet-like manner to inner surfaces of said solid imperforate side walls of the glass and flows down said inner surfaces to form a distinct liquid layer in the glass showing a distinct boundary between it and the liquid previously poured into the glass.

3. In a device for use in the preparation of varied layer drinks conventionally known as "Pousse Cafe" by pouring liqueurs of different colors, one after another, into a glass such as a cordial glass, the combination comprising a float adapted to fit loosely into the cordial glass which has solid imperforate side walls, a stem attached to the top of said float extending above the top of said glass and means positioned on said glass engaging said stem for holding said float in a predetermined orientation with respect to said glass so that it floats on the liquid poured into said glass and liquid poured thereon is directed in sheet-like manner to the inner surfaces of said solid imperforate side walls of the glass and flows down said inner surfaces to form a distinct liquid layer in the glass showing a distinct boundary between it and the liquid previously poured into the glass.

4. A device for use in making a varied-layer drink of different liqueurs or the like, the combination comprising a container having solid imperforate side walls of transparent material, a float having a diameter slightly less than the inner diameter of said container, said float having a substantially arcuate bottom part that is adapted to rest on liquid poured into the container to support the float so that its upper surface is above the top of the liquid in the container, the top surface of said float being shaped to guide the liquid poured on said top in sheet-like manner to the solid imperforate inner wall of said container so as to produce a thin flow of liquid on the inner wall of the container around and down beneath said float.

5. A device for use in preparing varied layer drinks and the like, the combination comprising a container of transparent material having the shape of a conventional cordial glass and having solid imperforate side walls, a float having a substantially hemispherical shape and having a diameter slightly less than the inner diameter of the glass, the arcuate bottom part of said float being adapted to support said float on the liquid in the glass so that the substantially flat upper part of said float is well above the upper surface of the liquid in the glass and guides the liquid poured thereon as a sheet-like flow to the inner surface of said imperforate side walls, means engaging said float and extending out of said glass for holding said float in predetermined orientation in said glass.

6. A device for use in preparing varied layer drinks and the like, the combination comprising a container of transparent material having the shape of a conventional cordial glass and having solid imperforate side walls, a float having a substantially hemispherical shape and having a diameter slightly less than the inner diameter of the glass, the arcuate bottom part of said float being adapted to support said float on the liquid in the glass so that the substantially flat upper part of said float is well above the upper surface of the liquid in the glass, means for holding said float in predetermined orientation in said glass and guides the liquid poured thereon as a sheet-like flow to the inner surface of said imperforate side walls, said holding means including apertured guide means positioned on the top of said glass for slidably engaging said holding means.

References Cited by the Examiner
UNITED STATES PATENTS

| | | | |
|---|---|---|---|
| 496,617 | 5/93 | Parker | 141—204 |
| 1,188,477 | 6/16 | Ostrander | 141—201 |
| 2,550,589 | 4/51 | Orme | 141—100 |
| 2,740,571 | 4/56 | Busto | 141—286 |

LAVERNE D. GEIGER, *Primary Examiner.*

LOUIS J. DEMBO, *Examiner.*